United States Patent
Gretz

(10) Patent No.: US 9,726,303 B1
(45) Date of Patent: Aug. 8, 2017

(54) ROOFTOP CONDUIT SUPPORT

(71) Applicant: Thomas J. Gretz, Port St. Lucie, FL (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 240 days.

(21) Appl. No.: 13/853,638

(22) Filed: Mar. 29, 2013

Related U.S. Application Data

(60) Provisional application No. 61/700,144, filed on Sep. 12, 2012.

(51) Int. Cl.
| | | |
|---|---|---|
| *F16L 3/00* | (2006.01) | |
| *F16M 11/00* | (2006.01) | |
| *E04G 3/22* | (2006.01) | |
| *E06B 7/28* | (2006.01) | |
| *B23Q 3/00* | (2006.01) | |
| *B23P 11/00* | (2006.01) | |

(52) U.S. Cl.
CPC ............. *F16L 3/00* (2013.01); *B23P 11/00* (2013.01)

(58) Field of Classification Search
CPC ......... F16M 11/045; F16M 11/22; F16L 3/00; B23P 11/00; Y10T 29/49616; Y10T 29/49826; Y01T 29/49623; Y01T 29/49625; Y01T 29/49947; Y01T 29/49966
USPC .......... 29/525.02, 525.01; 248/49, 174, 237, 248/346.03, 346.5; 269/16, 37, 136, 137, 269/902
See application file for complete search history.

(56) References Cited

U.S. PATENT DOCUMENTS

| | | | | |
|---|---|---|---|---|
| 4,078,752 | A | | 3/1978 | Kindorf |
| 4,384,594 | A | | 5/1983 | Moritz |
| 4,429,440 | A | * | 2/1984 | Laughlin et al. ............... 24/486 |
| 4,708,554 | A | * | 11/1987 | Howard .......................... 411/84 |
| 5,165,642 | A | * | 11/1992 | Rihaly ........................... 248/237 |
| 5,217,191 | A | * | 6/1993 | Smith ............................. 248/55 |
| 5,685,508 | A | * | 11/1997 | Smith ............................. 248/55 |
| 5,971,329 | A | | 10/1999 | Hickey |
| 6,105,216 | A | * | 8/2000 | Opperthauser ................. 24/459 |
| 6,250,591 | B1 | | 6/2001 | Cunningham |
| 6,364,256 | B1 | * | 4/2002 | Neider et al. ................... 248/55 |
| 6,445,588 | B1 | * | 9/2002 | Masterton et al. ........... 361/759 |
| 6,502,791 | B2 | * | 1/2003 | Parker ............................. 248/70 |
| 6,513,765 | B2 | | 2/2003 | Griffin et al. |
| 6,663,054 | B2 | * | 12/2003 | Robicheau ........... H02G 3/0456 248/49 |

(Continued)

*Primary Examiner* — Sarang Afzali
*Assistant Examiner* — Darrell C Ford

(57) ABSTRACT

A support device for elevating an object above a surface comprises a base and a strut. The base has a top and a bottom. The bottom is adapted to sit upon the surface and is wider than the top. The strut is affixed to the base and adapted to receive a fastener for affixing the object to the strut. The base may have a trapezoidal cross-sectional shape. The base may comprise a support flange along a perimeter of the bottom of the base. The strut may have a generally U-shaped cross-sectional shape with an elongated planar bottom and opposing elongated planar sides joined to opposing edges of the elongated planar bottom. The strut may be affixed to the base via one or more spacers such that the strut is positioned a predefined distance from the top of the base.

3 Claims, 10 Drawing Sheets

(56) References Cited

U.S. PATENT DOCUMENTS

| | | | |
|---|---|---|---|
| 6,679,461 B1* | 1/2004 | Hawkins | 248/74.2 |
| 6,948,687 B2* | 9/2005 | Shatzky | 248/74.4 |
| 7,168,210 B2* | 1/2007 | Krovats | 52/167.9 |
| 7,175,137 B2* | 2/2007 | Ferris et al. | 248/49 |
| 7,475,513 B2* | 1/2009 | Parker | 52/27 |
| 7,658,356 B1* | 2/2010 | Nehls | 248/300 |
| 7,731,131 B2* | 6/2010 | Trueb | 248/49 |
| 7,971,847 B1* | 7/2011 | Hartzell et al. | 248/688 |
| 8,109,049 B2* | 2/2012 | Suganuma et al. | 52/173.3 |
| 8,181,916 B2* | 5/2012 | Azuma et al. | 248/68.1 |
| 9,273,802 B2* | 3/2016 | Allendorf | F16L 3/02 |
| 9,523,380 B2* | 12/2016 | Brown | E04D 13/00 |
| 2001/0007342 A1* | 7/2001 | McCracken | 248/68.1 |
| 2003/0042374 A1* | 3/2003 | Johnson et al. | 248/148 |
| 2004/0037997 A1* | 2/2004 | Hawkins | 428/99 |
| 2005/0097836 A1* | 5/2005 | Krovats | 52/198 |
| 2006/0059789 A1* | 3/2006 | Sargent | 52/26 |
| 2006/0091265 A1* | 5/2006 | Smart | 248/49 |
| 2006/0131465 A1* | 6/2006 | Lynch et al. | 248/68.1 |
| 2007/0022676 A1* | 2/2007 | Krovats | 52/167.9 |
| 2007/0045482 A1* | 3/2007 | Smart | 248/68.1 |
| 2007/0120036 A1* | 5/2007 | Olle et al. | 248/615 |
| 2008/0053009 A1* | 3/2008 | Plaisted et al. | 52/173.3 |
| 2008/0054143 A1* | 3/2008 | Collins et al. | 248/227.2 |
| 2008/0197240 A1* | 8/2008 | Beck | 248/49 |
| 2010/0155545 A1* | 6/2010 | Birli et al. | 248/70 |
| 2011/0192941 A1* | 8/2011 | Lalancette et al. | 248/70 |
| 2011/0278411 A1* | 11/2011 | Carbonare et al. | 248/237 |
| 2012/0032045 A1* | 2/2012 | Lallier et al. | 248/237 |
| 2012/0073237 A1* | 3/2012 | Brown | 52/705 |
| 2012/0119037 A1* | 5/2012 | Azuma et al. | 248/65 |
| 2013/0140393 A1* | 6/2013 | Blaszczak | B65H 75/40 242/398 |
| 2014/0020224 A1* | 1/2014 | Heims et al. | 29/428 |
| 2014/0020230 A1* | 1/2014 | Jolley | F24J 2/5254 29/525.01 |
| 2014/0197282 A1* | 7/2014 | Turner | 248/49 |
| 2014/0332641 A1* | 11/2014 | Wilson et al. | 248/71 |
| 2015/0136931 A1* | 5/2015 | Fearon | B60S 5/00 248/346.03 |

\* cited by examiner

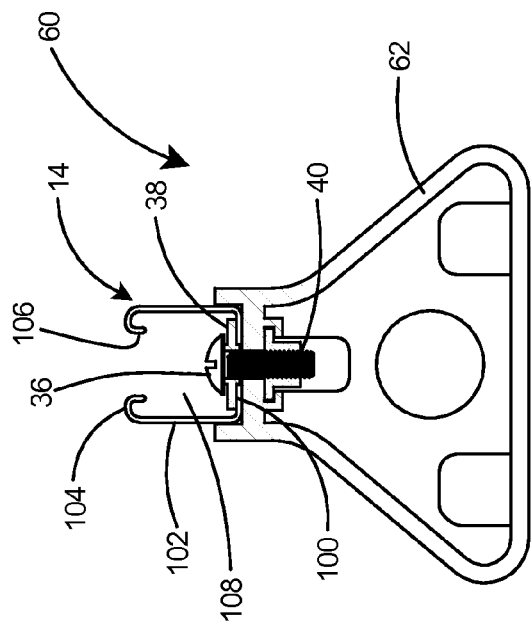
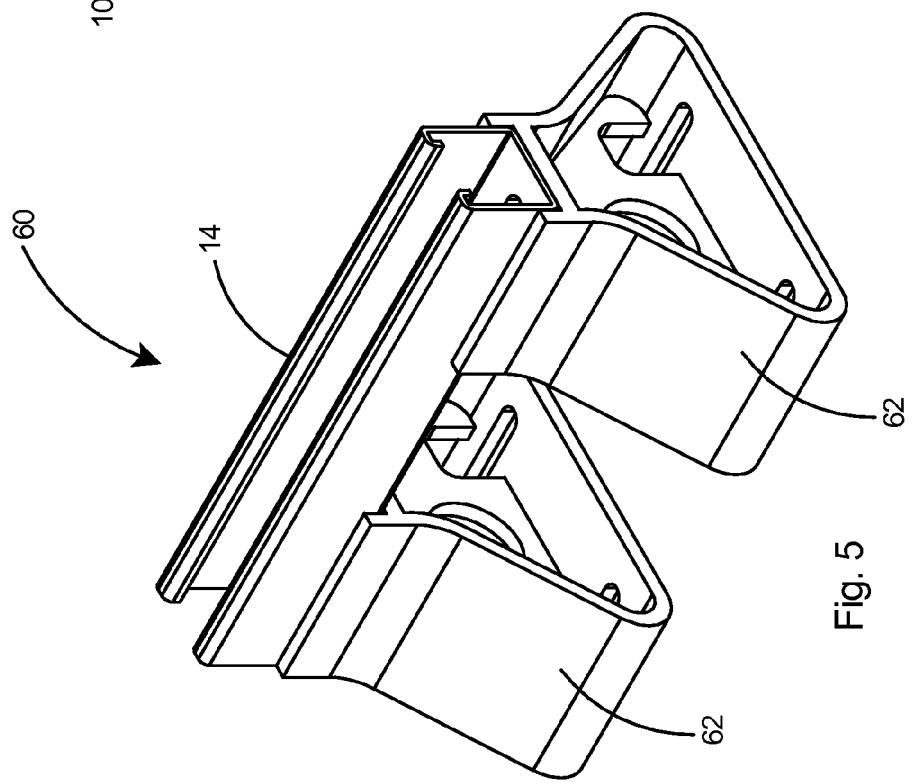

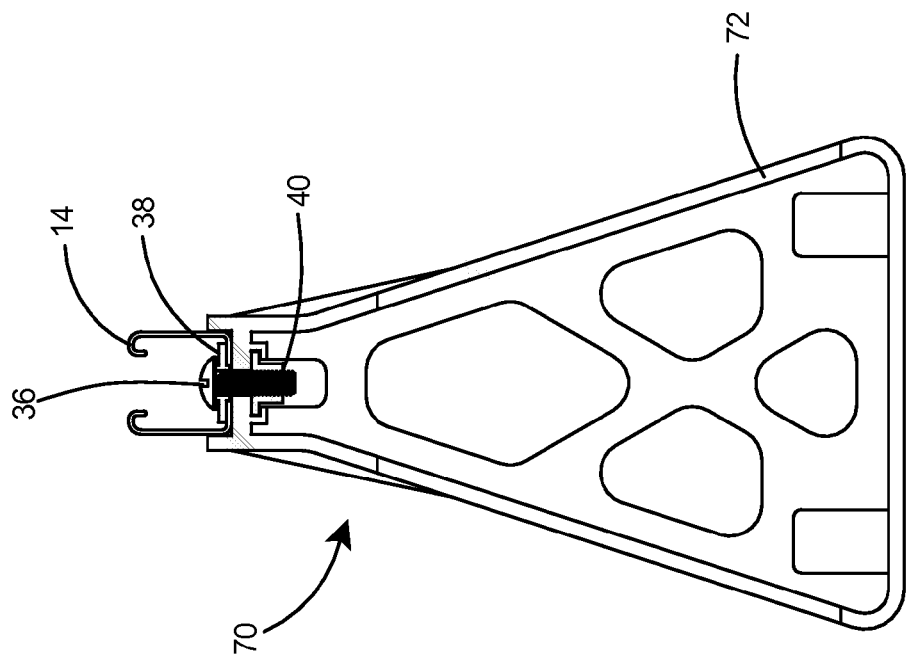
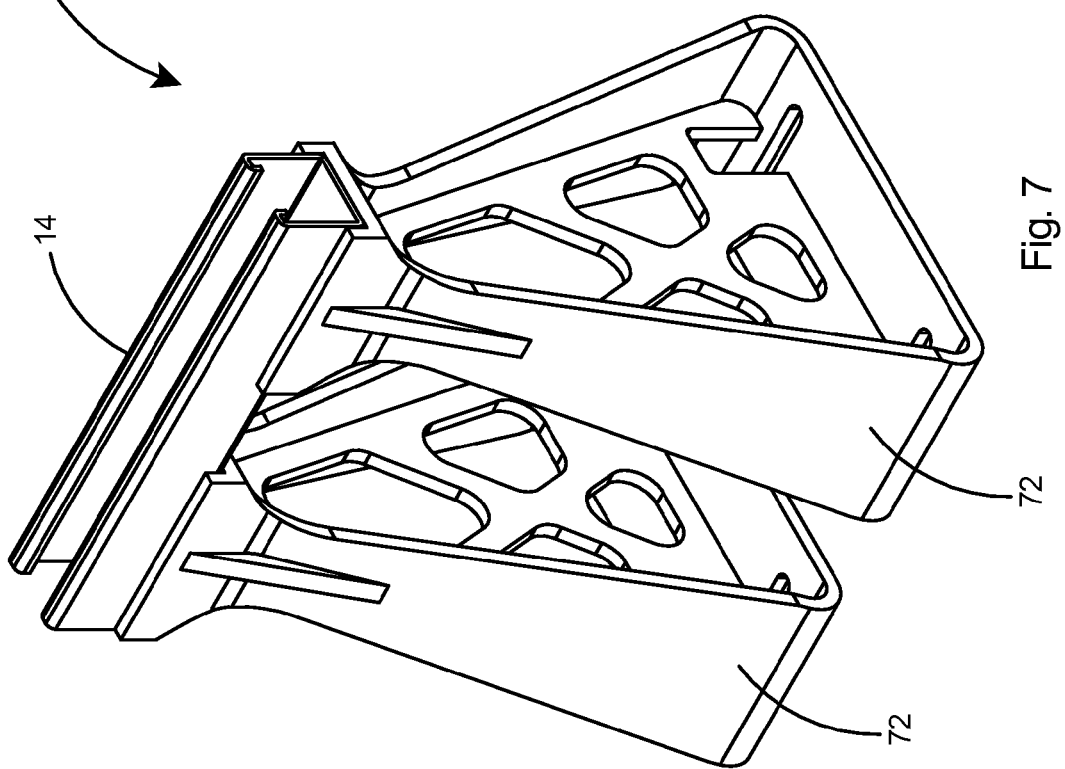

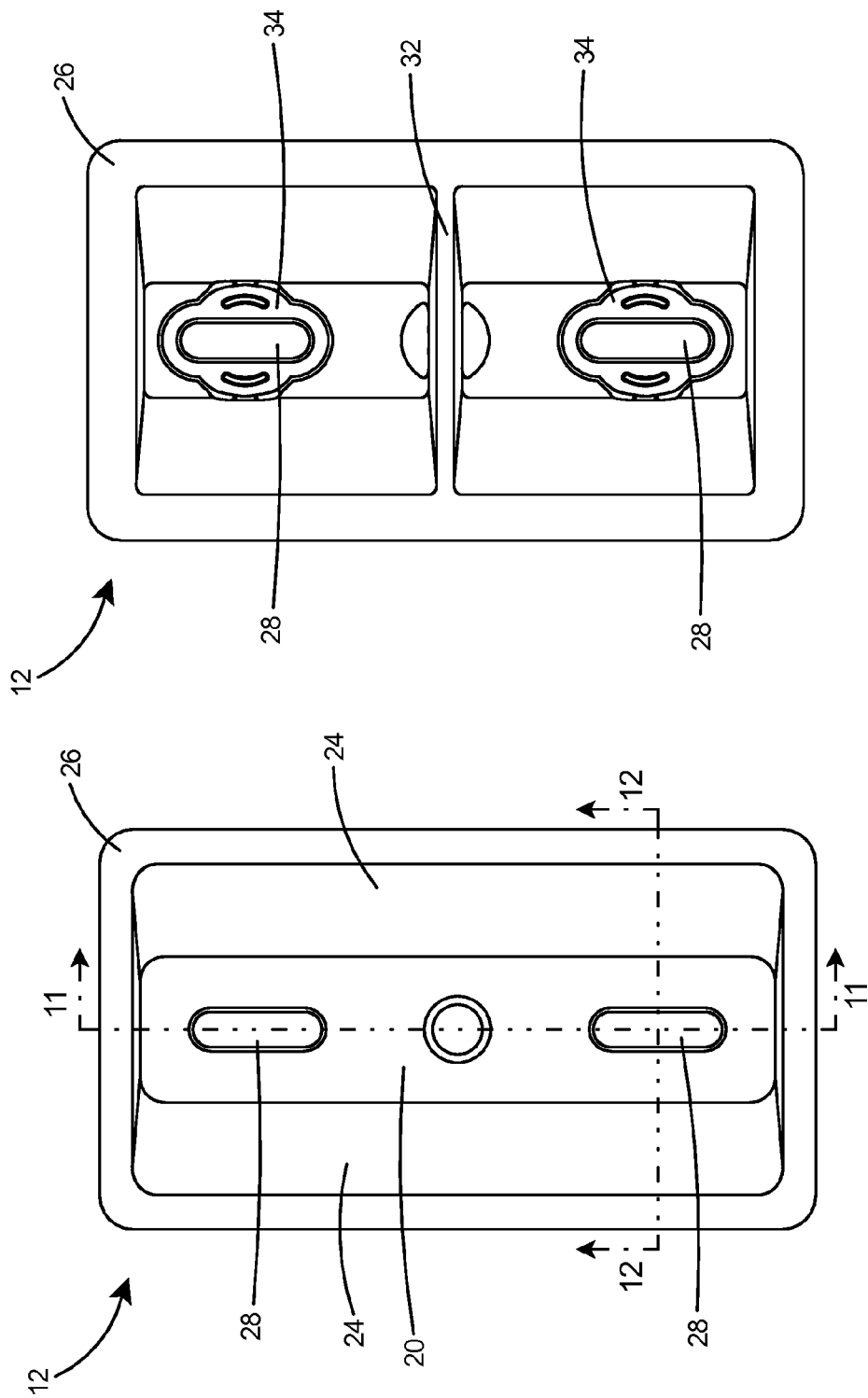

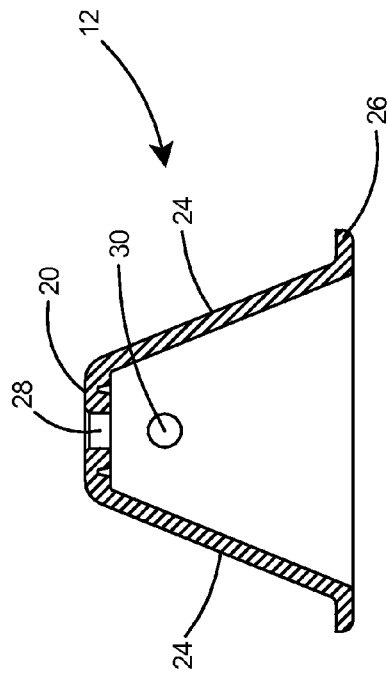
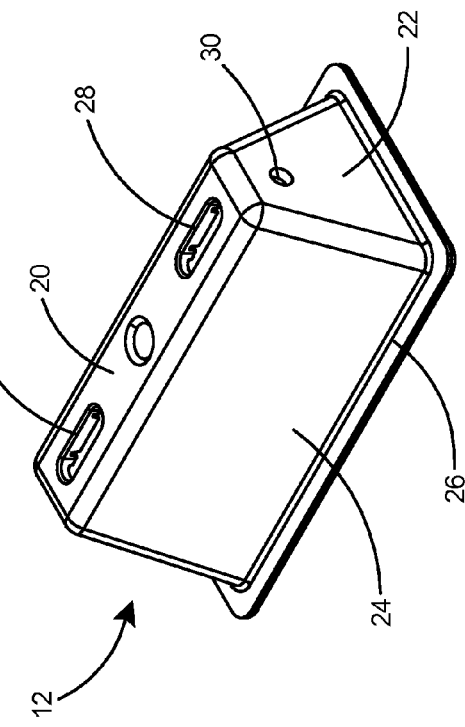
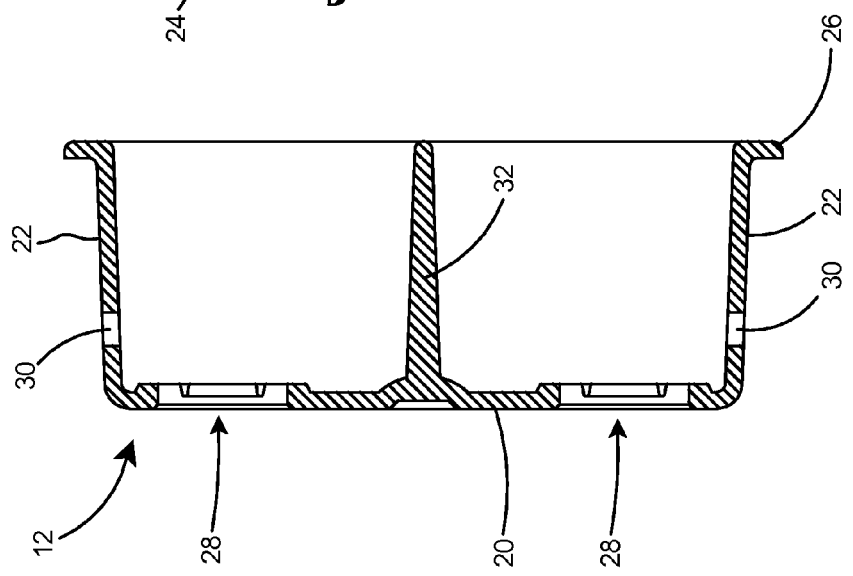

ROOFTOP CONDUIT SUPPORT

CROSS-REFERENCE TO RELATED APPLICATIONS

This application claims priority to provisional U.S. Application No. 61/700,144, filed Sep. 12, 2012, the contents of which are incorporated herein by reference in their entirety.

FIELD OF THE INVENTION

The present invention generally relates to devices for supporting objects, and more specifically to devices for supporting conduit.

BACKGROUND OF THE INVENTION

Many different types of structures and objects are placed on roofs, such as conduits, raceways, ducts, cable trays, and the like. Often these structures sit or lay on the roof surface. While such a placement may be convenient, there is no air circulation around all sides of the structure which may result in undesirably elevated temperatures of the structure.

BRIEF SUMMARY OF THE INVENTION

In one embodiment of the invention, a support device for elevating an object above a surface comprises a base and a strut. The base has a top and a bottom. The bottom is adapted to sit upon the surface and is wider than the top. The strut is affixed to the base and adapted to receive a fastener for affixing the object to the strut.

The base may have a trapezoidal cross-sectional shape. The base may comprise a support flange along a perimeter of the bottom of the base.

The strut may have a generally U-shaped cross-sectional shape with an elongated planar bottom and opposing elongated planar sides joined to opposing edges of the elongated planar bottom.

Corresponding holes may be defined in the top of the base and in the elongated planar bottom of the strut to enable affixation of the strut to the base. The support device may further comprise at least one generally L-shaped attachment bracket having a vertical leg adapted to be affixed to a side wall of the base and a horizontal leg adapted to sit atop an end of the elongated planar bottom of the strut to secure the elongated planar bottom of the strut between the top surface of the base and the horizontal leg of the attachment bracket.

The strut may be affixed to the base via one or more spacers such that the strut is positioned a predefined distance from the top of the base.

The base may be a first base and the support device may further comprise a second base having a top and a bottom. The bottom of the second base may be adapted to sit upon the surface and may be wider than the top. The strut may be affixed to the first and second bases such that there is a distance between the first base and the second base.

In addition to the support device for elevating an object above a surface, as described above, other aspects of the invention are directed to corresponding methods for elevating an object above a surface.

BRIEF DESCRIPTION OF THE SEVERAL VIEWS OF THE DRAWING(S)

Reference is made herein to the accompanying drawings, which are not necessarily drawn to scale, and wherein:

FIG. 5 is an isometric view of a rooftop conduit support, in accordance with alternative embodiments of the invention.

FIG. 6 is a side view of the rooftop conduit support of FIG. 5.

FIG. 7 is an isometric view of a rooftop conduit support, in accordance with alternative embodiments of the invention.

FIG. 8 is a side view of the rooftop conduit support of FIG. 7.

FIG. 9 is a top view of the base of the rooftop conduit support of FIG. 1.

FIG. 10 is a bottom view of the base of the rooftop conduit support of FIG. 1.

FIG. 11 is a cross-sectional view of the base of the rooftop conduit support of FIG. 1.

FIG. 12 is a cross-sectional view of the base of the rooftop conduit support of FIG. 1.

FIG. 13 is an isometric view of a base of the rooftop conduit support of FIG. 1.

DETAILED DESCRIPTION

Embodiments of the invention comprise a rooftop support for supporting objects and structures above a surface, such as a roof. Such objects and structures may include conduits, raceways, ducts, cable trays, and the like (hereinafter collectively referred to as conduits). The rooftop support of embodiments of the invention provides physical separation between the roof deck and the supported object (conduit, etc.), thereby providing air circulation around the supported object which in turns helps control the temperature of the supported object.

Figure 1:
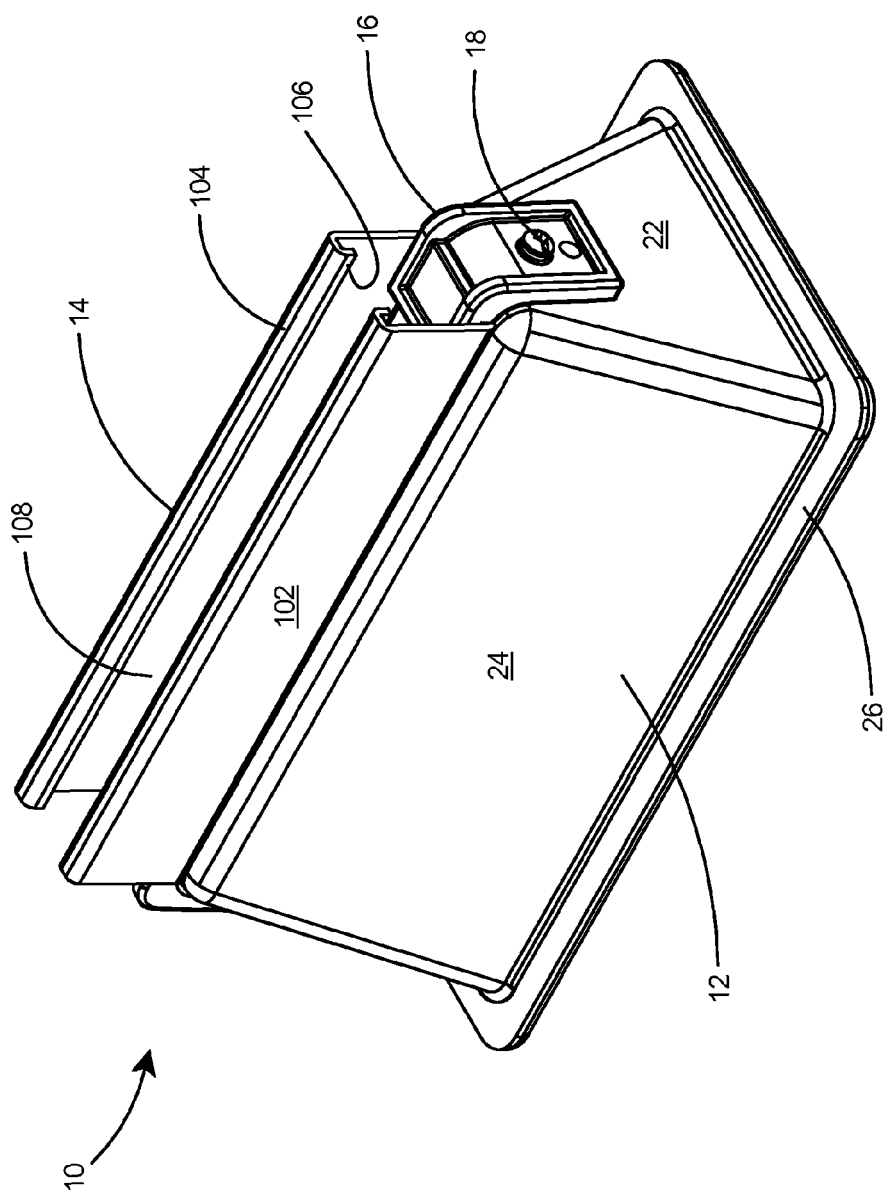
FIG. 1 is an isometric view of a rooftop conduit support, in accordance with embodiments of the invention.
Figure 2:
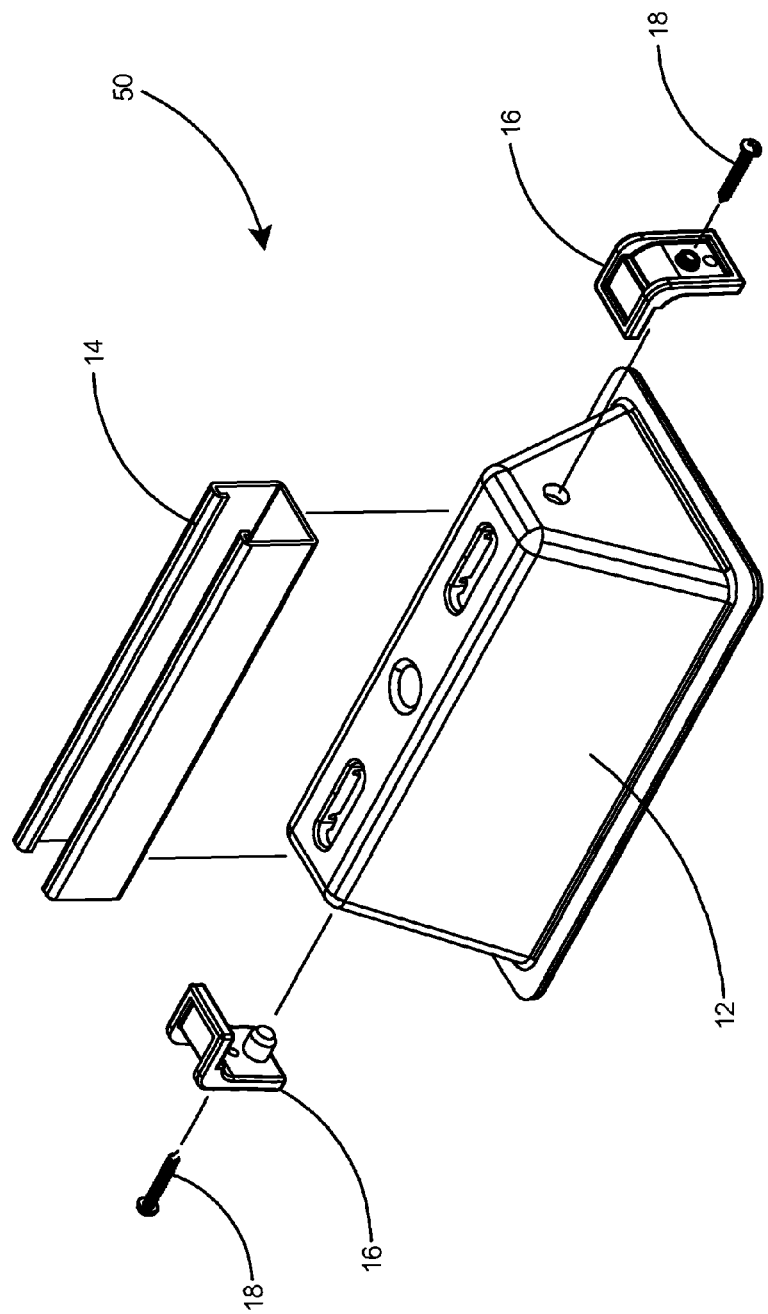
FIG. 2 is an exploded isometric view of the rooftop conduit support of FIG. 1.

In one embodiment of the invention, illustrated in FIGS. 1 and 2, rooftop support 10 comprises base 12, strut 14, attachment brackets 16, and screws 18. Base 12 is a rigid, heavy-duty hollow structure having an open bottom. The shape of base 12 (wide lower portion and narrow upper portion) enables base 12 to sit stably on the roof deck without the need to attach base 12 to the roof deck using mechanical fasteners. Base 12 is described in more detail below in relation to FIGS. 9-13.

Strut 14 sits on and is affixed to the top surface of base 12. Strut 14 is generally U-shaped when viewed from either end (perhaps best illustrated in FIGS. 6 and 8), with an elongated planar bottom (to conform to the planar top surface of base 12) and opposing elongated planar sides joined to opposing edges of the elongated planar bottom. The top edge of each elongated planar side is bent inward on itself, thereby forming an elongated lip or channel along the entire length of each elongated planar side. In use, the conduit or other supported structure sits atop strut 14 and is affixed to strut 14 using any suitable mechanical fastener (such as clamps or straps). The lips or channels of strut 14 enable the mechanical fastener(s) that is/are holding the conduit to be securely affixed to strut 14.

Strut 14 may be affixed to base 12 using any suitable means, including but not limited to any suitable mechanical fasteners. In the embodiments of FIGS. 1-4, attachment brackets 16 are used to affix strut 14 to base 12. Attachment brackets 16 are L-shaped brackets having a substantially vertical leg that is affixed to base 12 (such as by use of screws 18, bolts/nuts, or any other suitable fastening means) and a horizontal leg that sits atop an end of the elongated planar bottom of strut 14, thereby securing the elongated planar bottom of strut 14 between the top surface of base 12 and the horizontal leg of attachment bracket 16.

Figure 3:
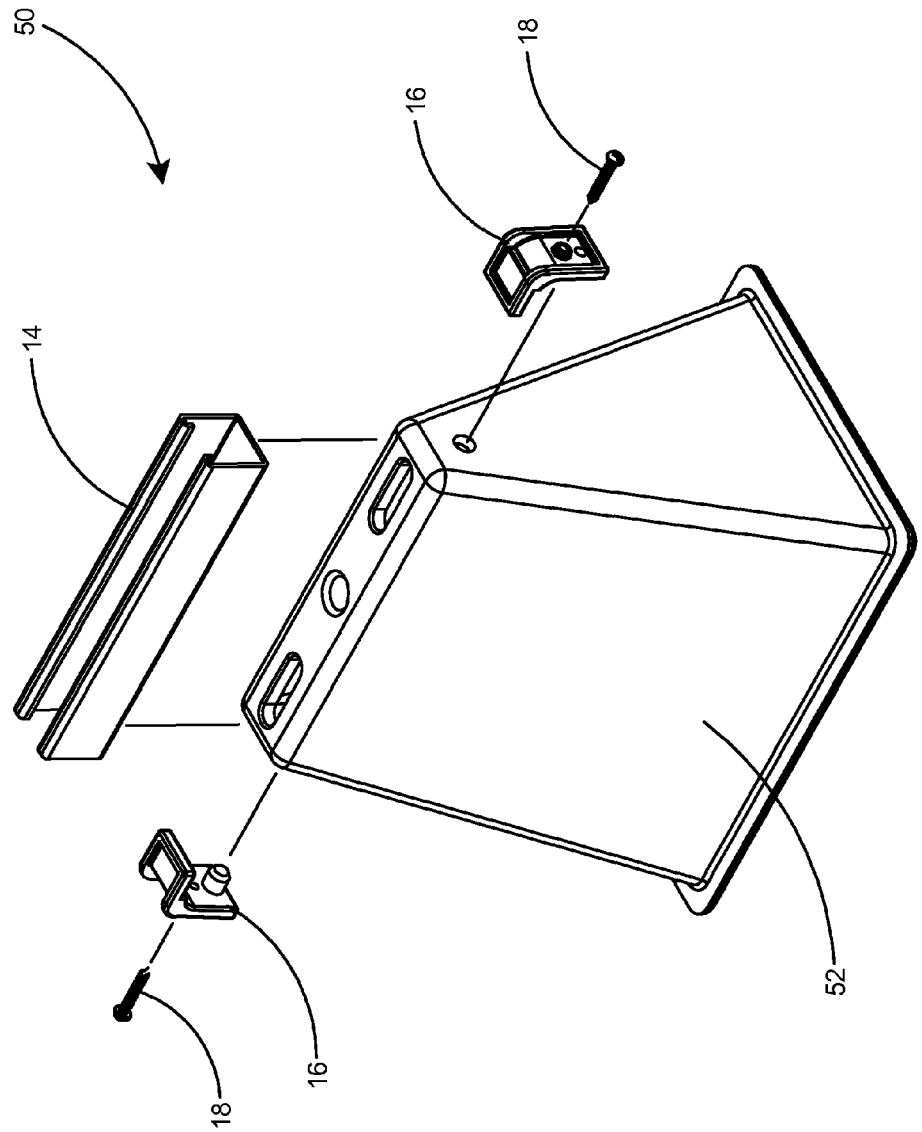
FIG. 3 is an exploded isometric view of a rooftop conduit support, in accordance with alternative embodiments of the invention.
Figure 4:
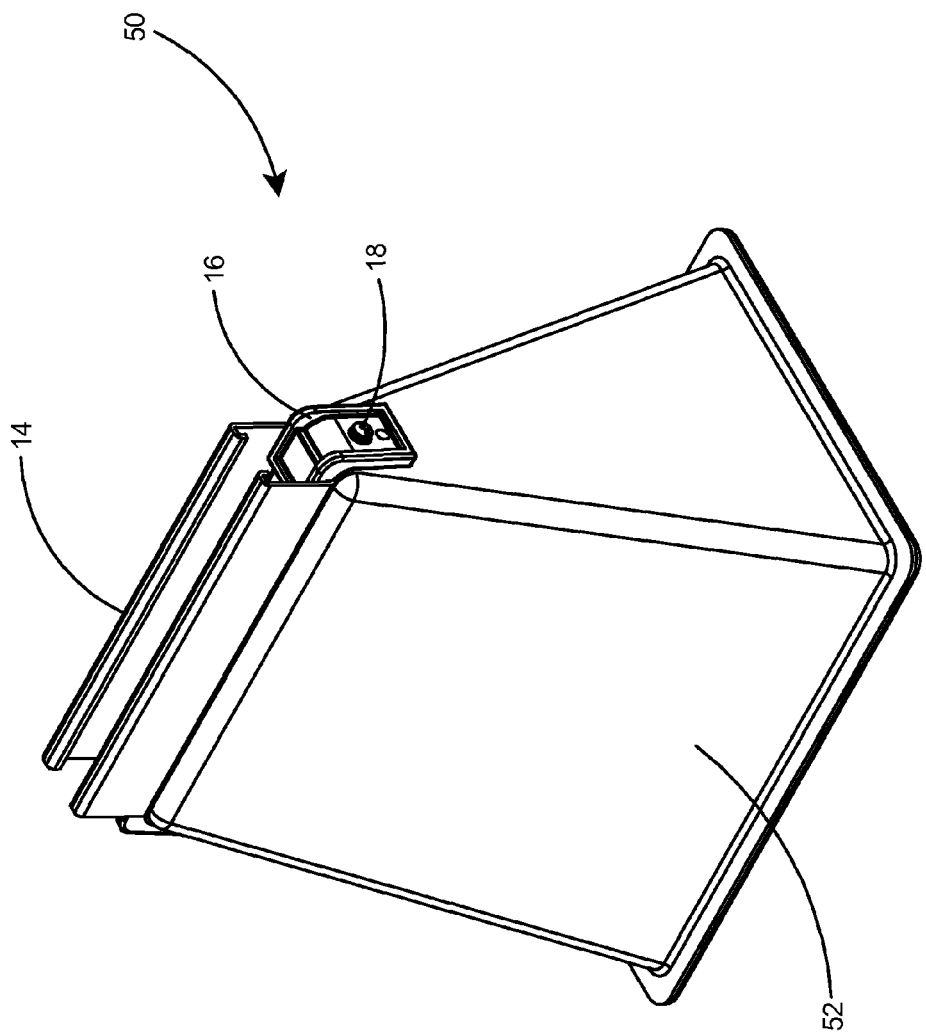
FIG. 4 is an isometric view of the rooftop conduit support of FIG. 3.

FIGS. 3 and 4 illustrate another alternative embodiment of the invention. Rooftop support 50 of FIGS. 3 and 4 is similar to rooftop support 10 of FIGS. 1 and 2. However, base 52 of rooftop support 50 has a greater height than base 12 of rooftop support 10, to enable a conduit to be supported at a greater height above the roof deck. The base of the rooftop support may have any desirable height, although a taller base may require a larger bottom portion to ensure stability of the rooftop support.

FIGS. 1-4 illustrate embodiments of the invention in which the rooftop support comprises a single base that has a length slightly longer than the length of the strut, such that the strut sits entirely upon one base. In alternative embodiments of the invention illustrated in FIGS. 5-8, the rooftop support may comprise two or more bases, each base having a length substantially shorter than the length of the strut, such that separate portions of the strut sit upon each base. FIGS. 5 and 6 illustrate rooftop support 60 which comprises two bases 62 supporting strut 14. As seen in FIGS. 5 and 6, opposing ends of strut 14 are supported by each of bases 62, with the middle portion of strut 14 being unsupported. Such a use of two or more bases generally enables less material to be used to make the bases, as the bases do not need to be as long as the strut. As with base 12 of FIGS. 1 and 2, the shape of bases 62 (wide lower portion and narrow upper portion) enables bases 62 to sit stably on the roof deck without the need to attach bases 62 to the roof deck using mechanical fasteners.

FIGS. 5 and 6 illustrate an alternative means of affixing a strut to the bases (or to a single base, as the means illustrated in FIGS. 5 and 6 could also be used for the embodiments of FIGS. 1-4). In the embodiments of FIGS. 5 and 6, corresponding holes are defined near in the bottom surface of strut 14 and in the top surfaces of bases 62. When the holes are lined up, bolt 36 may be passed through the holes and secured with nut 40. Washer 38 may optionally be used with bolt 36 for additional security. Strut 14 will typically define at least two holes, each hole being adjacent an opposing end of strut 14, although any suitable number of holes may be defined in strut 14.

FIGS. 7 and 8 illustrate another alternative embodiment of the invention. Rooftop support 70 of FIGS. 7 and 8 is similar to rooftop support 60 of FIGS. 5 and 6. However, bases 72 of rooftop support 70 have a greater height than bases 62 of rooftop support 60 to enable a conduit to be supported at a greater height above the roof deck. The bases of the rooftop support may have any desirable height, although taller bases may require a larger bottom portion to ensure stability of the rooftop support.

FIGS. 9-13 illustrate base 12 in more detail. Base 12 comprises top 20, opposing side walls 24, opposing end walls 22, and an open bottom. Support flange 26 extends outward from the perimeter or entire periphery of base 12, including both the side walls 24 and end walls 22, thereby surrounding the open bottom to provide additional stability. Interior wall 32 provides additional rigidity and strength. Top 20 defines a plurality of holes 28 (two holes are illustrated in FIGS. 9-13, but the number of holes may vary) for receiving a mechanical fastener in order to affix a strut to base 12. The holes in top 20 may be elongated as illustrated to enable positional adjustment of the strut, the holes may optionally be round, or a combination of round and elongated holes may be used. Holes 30 are defined in the end walls 22 for receiving a mechanical fastener (such as screw 18) in order to affix a strut to base 12 using attachment brackets 16 (as described above). Washers 34 abut holes 28 on the underside of top 20 to provide additional rigidity and security. Base 12 may be made of any suitable material having sufficient strength, rigidity, and durability, including but not limited to thermoplastic polyolefin.

Figure 14:
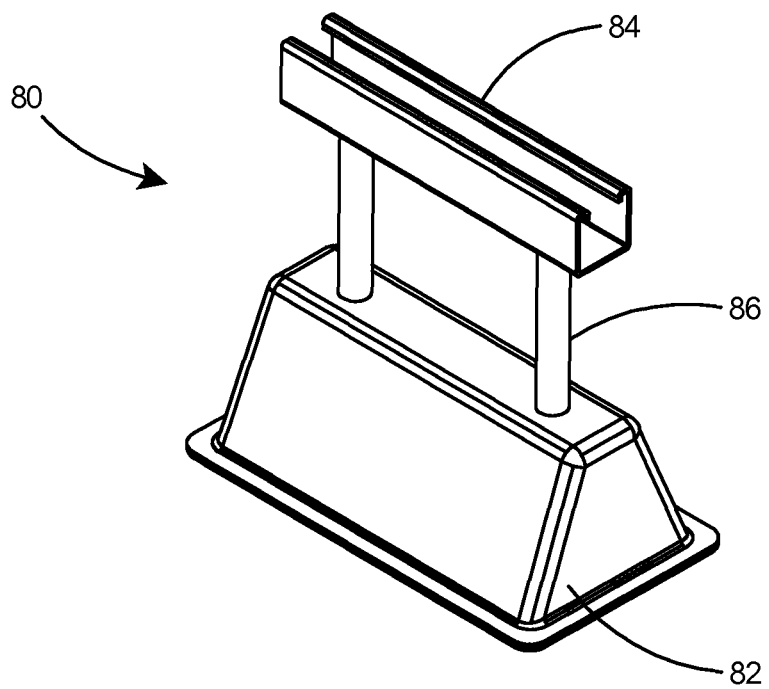
FIG. 14 is an isometric view of a rooftop conduit support, in accordance with alternative embodiments of the invention.

In an alternative embodiment of the invention illustrated in FIG. 14, spacer rods or other spacer means are used to elevate the strut above the base. Rooftop support 80 of FIG. 14 comprises base 82, strut 84, and spacer rods 86. The height of the spacer rods or other spacer means may be selected to provide the rooftop support with any desired total height, thereby enabling a conduit to be supported at any desired height above the roof deck.

Figure 15:
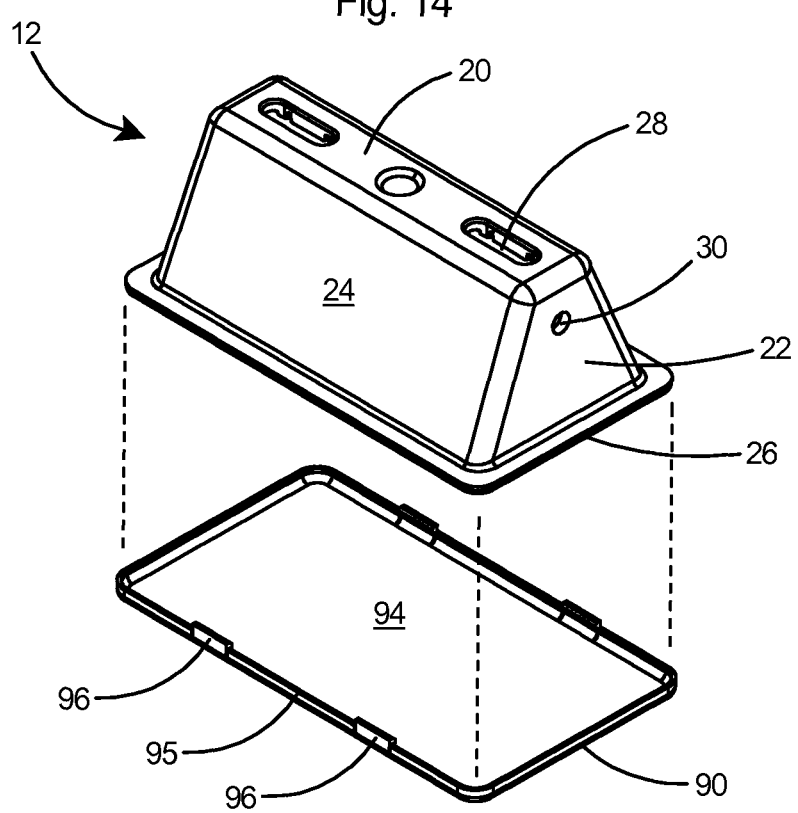
FIG. 15 is an exploded isometric view of a rooftop conduit support, in accordance with alternative embodiments of the invention.
Figure 16:
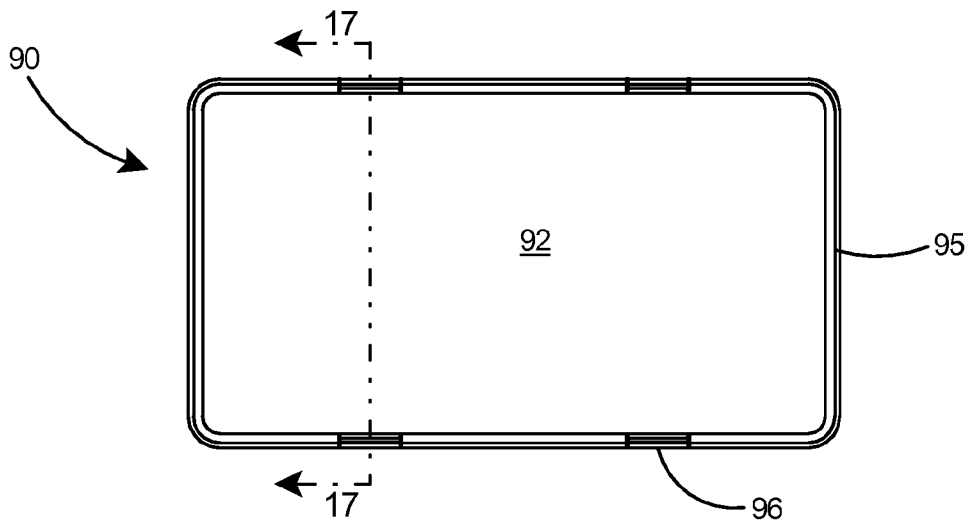
FIG. 16 is a plan view of a sled member that forms a portion of the rooftop conduit support of FIG. 15.
Figure 17:
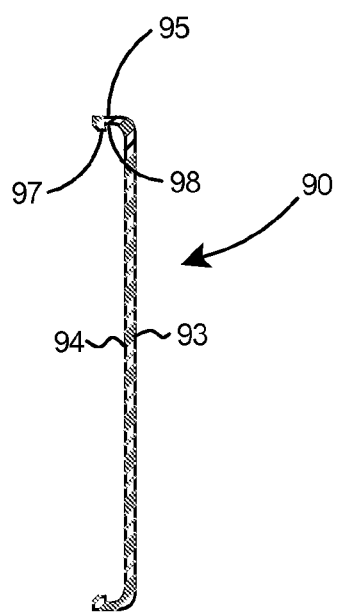
FIG. 17 is a sectional view of the sled member taken along line 17-17 of FIG. 16.
Figure 18:
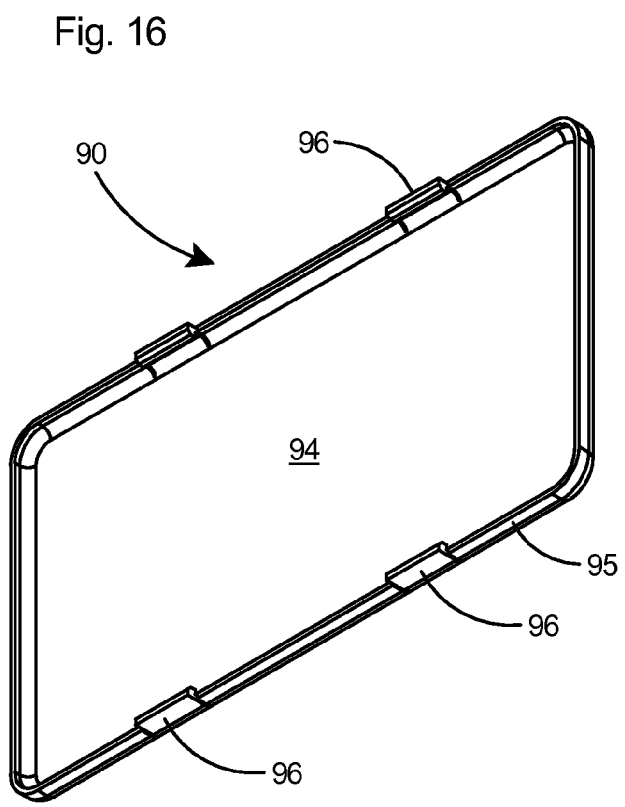
FIG. 18 is an isometric view of the sled member.

In another alternative embodiment of the invention illustrated in FIGS. 15-18, a sled member 90 can be affixed to base 12 of rooftop conduit support in order to provide a larger surface area to the base 12 in order to prevent damage to rubber roofing materials. Rubber roofing materials, such as membranes applied to flat roofs, can become soft on hot summer days, especially in direct sunlight, and sled member 90 distributes the load over a larger area of the roof. Sled 90 includes a flat panel 92 having a bottom side 93 and a top side 94. A peripheral wall 95 extends from the top side 94 around the entire periphery of the flat panel 92. A plurality of clamp arms 96 extend from the peripheral wall 95. As shown in FIG. 17, clamp arms 96 include inward extending arms 97 that form a gap 98 between the panel 92 and the arms 97. Sled 90 is preferably molded of plastic and forms a substantially rigid yet flexible sled member 90. Clamp arms 96 are flexible and capable of flexing outward from the peripheral wall 95. As shown in FIG. 15, sled 90 may be attached to base 12 by simply aligning the sled 90 with the base and pressing sled 90 against the base 12. Clamp arms 96 flex outwardly of peripheral wall 95 and snap onto support flange 26 of base member 12 thereby securing the sled 90 to the base.

With reference to FIG. 6, the strut 14 of the rooftop support is typically constructed of metal, such as galvanized steel. Strut 14 includes a channel bottom 100, opposing channel sides 102, a top arm 104 extending inwardly of each of the channel sides 102, and a lip 106 extending downward into the channel 108 defined by the channel bottom 100 and channel sides 102.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A support device for elevating an object above a surface, the support device comprising:
   a base having side walls, end walls, a planar top extending from said side walls to said end walls, and an open bottom, the bottom including a periphery, the bottom being adapted to sit upon the surface, the bottom being wider than the top, said end walls including an aperture;
   a strut affixed to the base and adapted to receive a fastener for affixing the object to the strut;
   said strut including an elongated planar bottom and opposing elongated planar sides joined to opposing edges of the elongated planar bottom, the elongated planar sides each including a top edge, the top edge of each elongated planar side bent inward to form a channel on said strut, said strut including a top arm extending inwardly of the planar sides and a lip;
   the elongated planar bottom of said strut conforming to and affixed in a flush fit to the planar top of said base;
   a planar support flange defining a flange top side, a flange bottom side, and a flange radial outer side, said planar support flange extending outward from the periphery of the bottom of the base such that the flange radial outer side extends radially away and surrounding the base;
   a sled attachable to said base, said sled including a flat panel including a bottom side, a top side, a peripheral wall including a top surface extending from said top side of said flat panel, and a plurality of clamp arms extending from said peripheral wall;
   said sled is attachable to said base by snap engagement of said clamp arms of said sled with said planar support flange of said base;
   said peripheral wall of said sled engaging each of the planar support flange bottom side and the planar support flange radial outer side, and the clamp arms engaging the planar support flange top side to secure said base to said sled in a non-sliding engagement;
   an L-shaped attachment bracket having a vertical leg adapted to be affixed to said end walls of said base and a horizontal leg adapted to sit atop an end of the elongated planar bottom of the strut to secure the elongated planar bottom of the strut in a flush fit between the planar top of the base and the horizontal leg of the attachment bracket;
   an aperture in said vertical leg of said L-shaped attachment bracket and a fastener extending through said aperture in said end wall and said aperture of said vertical leg of said L-shaped attachment bracket; and
   an aperture in said channel bottom of said strut, an aperture in said planar top of said base, and a fastener and nut securing said strut to said base.

2. The support device of claim 1, wherein the strut is affixed to the base via one or more spacers such that the strut is positioned a predefined distance from the top of the base.

3. The support device of claim 1, wherein the base is a first base, wherein the support device further comprises a second base having a top and a bottom, the bottom being adapted to sit upon the surface, the bottom being wider than the top; and wherein the strut is affixed to the first and second bases such that there is a distance between the first base and the second base.

* * * * *